United States Patent [19]

Earl

[11] 3,745,819

[45] July 17, 1973

[54] LOAD INDICATING APPARATUS

[75] Inventor: Webster B. Earl, Pfafftown, N.C.

[73] Assignee: Fairchild Industries, Inc., Germantown, Md.

[22] Filed: Dec. 8, 1911

[21] Appl. No.: 205,935

[52] U.S. Cl. .............. 73/133 R, 73/136 R, 73/140
[51] Int. Cl. ............................................. G01l 5/00
[58] Field of Search .................. 73/133 R, 136 R, 73/140; 82/33

[56] References Cited
UNITED STATES PATENTS

| 2,056,586 | 10/1936 | Rohm | 82/33 |
| 2,957,343 | 10/1960 | Hornbostel | 73/136 R |

Primary Examiner—Charles A. Ruehl
Attorney—Michael W. York

[57] ABSTRACT

Apparatus for detecting radial loads on a rotatable member and for providing indication or signal that is representative of these loads, including two tapered roller bearings having their tapered rollers tapering in the same direction that support the rotatable member. The tapered roller bearings are adapted to generate axial thrust forces in proportion to the load to cause axial translation of the rotatable member in response to the radial loads imparted to the rotatable member. A piston is located adjacent to one end of the rotatable member and is adapted to move axially in response to axial translation of the rotatable member. A flexible diaphragm is operatively connected to the piston and the flexible diaphragm forms a part of a variable fluid pressure chamber that is adapted to receive pressurized fluid from an external source through a fluid pressure regulating system which includes a valve member operably connected to the piston and the flexible diaphragm that introduces fluid into the pressure chamber in proportion to the axial thrust developed by the tapered roller bearings in response to the radial loads being exerted upon the rotatable member. The fluid pressure in the chamber is thus regulated by the axial movement of the rotatable member resulting from the radial loads imposed on the rotatable member and this enables the flexible diaphragm and rotatable member to assume an equilibrium or balanced operating position. A fluid pressure gauge is operatively connected to the pressure chamber to provide an indication of the pressure within the pressure chamber and thus an indication of the amount of the radial load imposed on the rotatable member.

10 Claims, 2 Drawing Figures

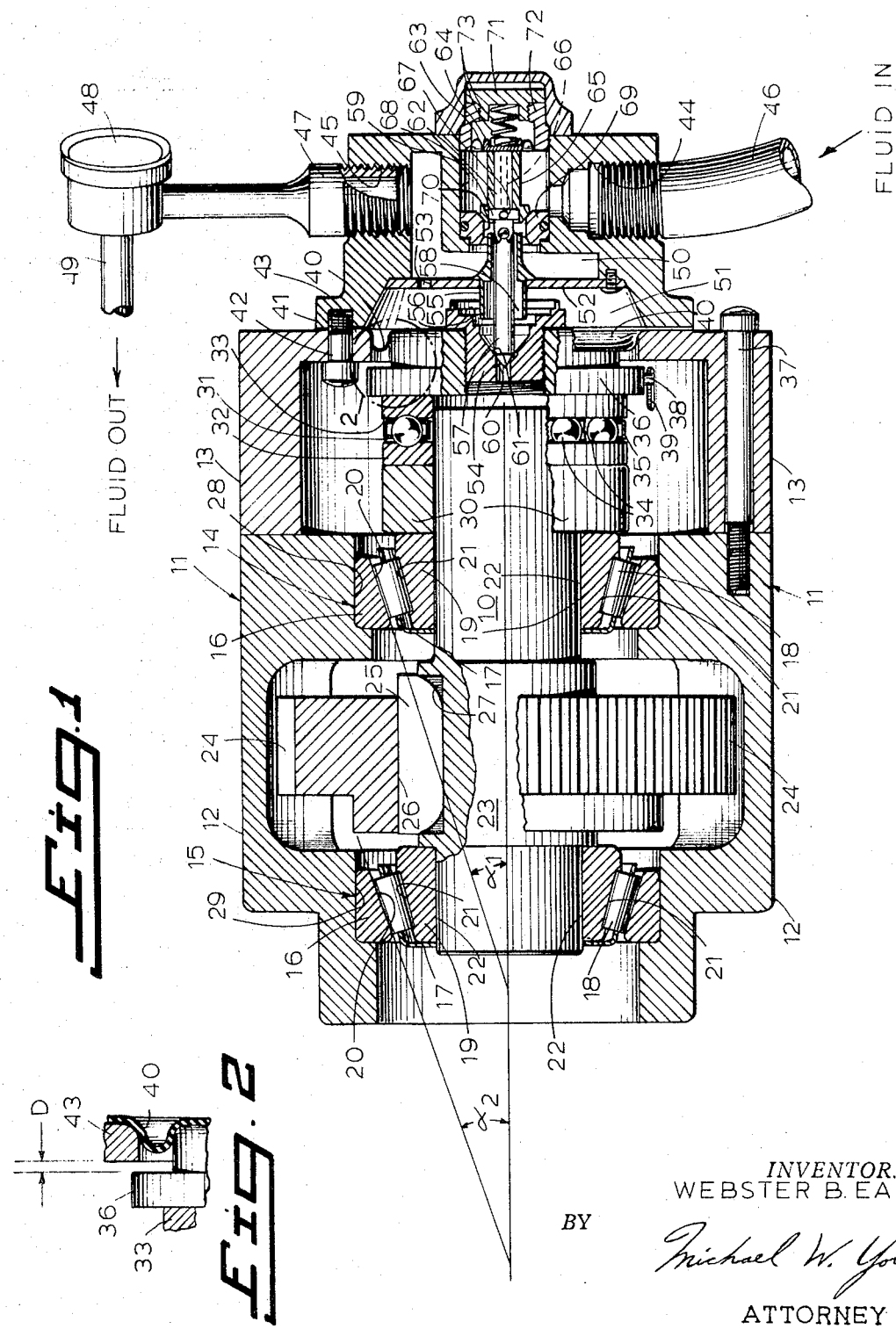

LOAD INDICATING APPARATUS

BACKGROUND OF THE INVENTION

It is often necessary to detect or measure the loads that are imposed upon rotating members such as shafts, machinery components, and the like so that this information might be readily available and utilized for a variety of purposes. As an example, such information is frequently required in the laboratory as well as in the design, development, and refinement of numerous mechanisms. Moreover, certain types of machinery such as printing presses, conveyors, paper machinery, automatic tensioners and the like, often rely upon the loads as well as variations in these loads as they are applied to certain of their rotating members to initiate signals that are responsive to these loads and load variations, which are then used for the precise regulation and control of related equipment. In such cases, the accurate measurement of these loads as well as the ability to rapidly sense load variations is of critical importance.

Accordingly, various types of mechanisms have been devised and employed for this purpose and the apparatus disclosed in U. S. Pat. Nos. 2,957,343 and 2,783,645 are indicative of a type that has been utilized in the past. In both of these patents the measurement of loads placed upon rotating shafts relies upon the use of helical gears that are connected to the rotating shafts to introduce an axial force component that results in an axial movement of a shaft. This axial shaft movement is resisted by an opposing force and the amount of opposing force necessary to resist the axial movement of the rotating shaft indicates the amount of load transmitted to the shaft, through the helical gears.

However, since these mechanisms require helical gears to obtain axial movement of a rotating member for their successful operation, their use is not always appropriate or desirable since in many cases the helical gears can unduly complicate and otherwise penalize the mechanical arrangements in which they are used. Moreover, the friction forces that are coincident with the use of such helical gears oftentimes impose the additional burden of increased power requirements that must be contended with by the equipment in which such devices are utilized. These deficiencies create severe handicaps that in many instances preclude the use of such apparatus that use helical gears or introduce a number of additional factors that must be taken into account or compensated for to obtain a resonably accurate indication of the loads imposed upon a rotating member.

Apparatus such as those disclosed in U. S. Pat. Nos. 2,957,343 and 2,783,645 that utilize helical gears are also not capable of detecting radial loads that may be imposed upon a shaft that may rotate in either direction since the helical gears will impart the appropriate axial movement to a shaft when they are rotating only in one direction and this limits the usefulness of apparatus that utilize helical gears.

The load measuring apparatus of this invention overcomes these disadvantages and provides an improved apparatus for detecting and indicating radial loads imposed upon a rotating member that does not require the use of associated helical gears and the like.

SUMMARY OF THE INVENTION

This invention relates to apparatus for indicating loads imposed upon a rotating member and more particularly to an apparatus for indicating radial loads imposed upon a rotatable member in which the radial load causes axial movement of the rotatable member that can be utilized to provide an indication of the radial load imposed upon the rotatable member.

It is accordingly an object of this invention to provide an apparatus which can be readily utilized to indicate radial loads imposed upon a rotatable member.

It is also an object of this invention to provide an apparatus for indicating radial loads imposed upon a rotatable member which provides an accurate and rapid indication of the radial loads imposed upon the rotatable member.

It is a further object of this invention to provide an apparatus for indicating radial loads imposed upon a rotatable member which can be readily incorporated into existing machinery which utilizes the rotatable member itself and its supporting bearing elements to provide an indicating of the radial load imposed upon the rotatable member.

It is another object of this invention to provide an apparatus for indicating radial loads imposed upon a rotatable member that is suitable for use with a wide variety of rotating equipment.

The present invention provides an apparatus for providing an indication of radial loads that includes a rotatable member for receiving the radial loads, means for supporting the rotatable member and a plurality of tapered roller bearings located around the rotatable member. The supporting means is adapted to permit axial movement of the rotatable member and it has means for limiting the extent of the axial movement of the rotatable member. Each of the roller bearings has an inner bearing cone located around and adjacent to the rotatable member, an outer bearing cup connected to the supporting member, and tapered rollers located between the inner bearing cone and the outer bearing cup. Each of the plurality of tapered roller bearings have their tapered rollers tapering in the same direction and the inner bearing cones of each of the plurality of tapered roller bearings are movable axially in the same direction from their seated positions in the respective outer bearing cups in response to the radial load received by the rotatable member and are adapted to exert an axial force against the rotatable member to cause axial movement of the rotatable member in response to the radial load received by the rotatable member. Means are located adjacent to the rotatable member to exert a force upon the rotatable member that balances the forces exerted against the rotatable member by the inner bearing cones as a result of the radial load received by the rotatable member and means are operatively connected to the force exerting means for providing an indication related to the radial loads received by the rotatable member.

BRIEF DESCRIPTION OF THE DRAWINGS

The invention will be hereinafter more fully described with reference to the accompanying drawings in which:

FIG. 1 is an elevational view, mostly in section, of the load indicating apparatus of the present invention; and FIG. 2 is a broken view of part of the structure illustrated in FIG. 1 taken within the circle 2 thereof.

DETAILED DESCRIPTION OF THE PREFERRED EMBODIMENT

Referring now to the FIG. 1 in the drawings, it will be noted that a rotatable member or shaft 10 for receiving radial loads is rotatably supported within supporting means for supporting the rotatable member comprising a substantially cylindrical housing 11, that comprises two housing members 12 and 13 by two conventional tapered roller bearings 14 and 15 which are secured inside the housing and are spaced apart from one another and disposed around the shaft. The tapered roller bearings 14 and 15 are substantially identical with one another and are situated in an unusual manner so that their rollers taper in the same direction, which is to the left as illustrated in FIG. 1. Each of these tapered roller bearings 14 and 15 comprises an outer cup 16, a conical cage 17, a plurality of uniformly spaced conically shaped tapered rollers 18 rotatably supported in the conical cage in a customary fashion, and an inner bearing cone 19 which is located around and adjacent to the shaft 10. The tapered rollers 18 are adapted to cooperate with the tapered surface 20 provided on the outer bearing cup 16 and they ride within a peripheral groove 21 that is formed by a depressed portion on the conical surface of the inner bearing cone 19 of each of the bearings 14 and 15, which accommodates the conical tapered rollers and assists in maintaining alignment of the rollers, the cage 17 and the bearing cone 19. The inner bearing cone 19 of each of the tapered bearings 14 and 15 is provided with a central aperture 22 to permit the bearings to be mounted around the shaft 10 in a customary manner. A portion of the surface of the end of the bearing cone 19 of the bearing member 15 which faces in the direction away from the nearest shaft end, bears against the adjacent surface of an enlarged portion 23 of the shaft that is adapted to accommodate a load transmitting member.

In the present embodiments, the loads are transmitted to the shaft 10 by a pinion 24 which may, of course, mesh with other components of a gear train (not shown). However, it should be fully understood and appreciated that the pinion 24 is representative of any of a variety of means which may be utilized to transmit a load to the shaft. For example, a belt and pulley arrangement, chain or any other similar device, might be used in a specific arrangement in place of the pinion 24, without influencing the operation or departing from the spirit of this invention. In this embodiment, the pinion 24 is secured to the shaft 10 in a well-known manner by means of a key 25 that is accommodated within a keyway 26 which is provided in the pinion, and within a key slot 27 in the enlarged portion 23 of the shaft that is located between the spaced bearings 14 and 15.

The outer bearing cups 16 of the tapered roller bearings 14 and 15 are respectively accommodated within recesses 28 and 29 that are provided in the housing 11. The diameter of the outer bearing cups 16 of the bearing members 14 and 15 are appropriately sized so that the roller bearing cups may be pressed into and be securely held within the respective recesses 28 and 29 and thus be securely connected to the housing 11.

The shaft 10 extends beyond the tapered roller bearing 14 and is fitted with a collar member 30 that encircles and is rigidly secured to the shaft 10 and abuts the surface of the end of the inner bearing cone 19 of the tapered roller bearing 14. A conventional ball bearing assembly 31 is situated at the end of the shaft 10 adjacent to the collar 30 and serves as a thrust bearing. This thrust bearing is also of a conventional type and comprises first and second bearing races 32 and 33 respectively, and a plurality of uniformly spaced ball elements 34 that are held therebetween by a ball cage 35, in a well-known manner. This thrust bearing 31 is axially aligned with the collar 30 and abuts the surface of the end of the collar that is oppositely disposed from the surface of the end of the collar that is in contact with the surface of the end of the inner bearing cup 19 of the tapered roller bearing 14. It will also be noted that the outer end of the second bearing race 33 of the thrust bearing 31 extends in a direction beyond the furthermost extremity of the adjacent end of the shaft 10 and is in contact with the flat surface of the end of a piston member 36 which is situated near the adjacent end of the shaft and is in axial alignment with the shaft.

It should be noted that the piston member 36, thrust bearing 31, collar 30, as well as that portion of shaft 10 supporting the thrust bearing and collar, are enclosed within the removable housing member or portion 13 that is secured to the housing member 12 by a plurality of suitably threaded bolts 37 (only one of which is shown) to provide for easy assembly and for accessibility to the components contained within the housing 11.

The piston member 36 is movable axially, but is restrained from rotating by a pin 38 that extends from the outer surface of the piston member and rides in a slot 39 in the housing member 13. The piston member 36 is also resiliently supported by a flexible diaphragm 40 which is secured to the piston and which is clamped at its outer periphery between the removable housing member or portion 13 and a flange provided on a fluid pressure regulator valve housing or regulator valve body 41. The valve body 41 contains a number of fluid pressure regulating components and is sealingly connected to the housing member 13 by a plurality of radially disposed and uniformly spaced fastening bolts 42, only one of which is shown for clarity. These bolts pass through a comparable number of apertures in a flange 43 that is provided on the removable housing member 13 and a like number of apertures are also provided in the peripheral area of the diaphragm 40 to permit the passage of these bolts, so that they may threadably engage the pressure regulator valve body 41 to sealingly secure the pressure regulator valve body and diaphragm 40 against the flange 43 of the housing member 13.

The fluid pressure regulator valve body 41 is equipped with inlet and outlet ports 44 and 45 respectively, which can accommodate respective fluid conduits 46 and 47 which are threadably connected to these ports to admit fluid into the regulator valve body and to permit fluid to exit from the regulator valve body. A fluid pressure gauge 48 may be suitably calibrated and interposed at any point in the fluid outlet conduit 47 in any well-known manner to provide a visual indication of the fluid pressure in the regulator valve body 41 which, as will later become apparent, will provide a proportional representation of the radial loads imparted to the rotatable shaft 10. The outlet port 45 may also be connected, such as by a conduit 49 connected to the gauge 48, to a control system (not shown), so that the fluid pressure in the regulator valve body 41 can be used as a signal for regulating and control purposes.

An expansion chamber 50 is located in the regulator valve body 41 and adjacent to it is a pressure control chamber 51. The chambers 50 and 51 are separated from each other by a seal plate 52 that forms a fixed partition between the chambers and is clamped to a face on the valve body 41 by means of a suitable number of screws. The flexible diaphragm 40 forms one wall of the chamber 51 and it is thus obvious that the volume of chamber 51 is variable in accordance with a position of the flexible diaphragm and the connected piston member 36. A restricted aperture 53 is provided through the seal plate 52 and this aperture permits a limited flow of fluid between the chambers 50 and 51.

A relief valve body 54 is centrally located with respect to the flexible diaphragm 40 and the piston member 36 and this valve body has a flanged portion which sealingly engages the surface of the diaphragm and maintains the diaphragm against the piston member and a reduced diameter portion which extends into and threadably engages a central bore provided in the piston member to sealingly clamp the diaphragm to the piston member. A jet tube 55 is sealingly affixed to the seal plate 52 and extends into the chamber 51 in proximity to the relief valve body 54 which is provided with a cylindrical stepped cavity 56 that accommodates the end of the jet tube. The jet tube 55 encircles a relief valve pintle 57 and is of suitable size to provide a restricted fluid passageway 58 between the inner surface of the jet tube and the outer surface of the pintle. The jet tube also extends in the opposite direction and passes through the expansion chamber 50 and terminates with a cylindrical bore 59 provided in the regulator valve body 41.

The portion of the relief valve body 54 that lies within the piston member 36 has a small diameter bore 60 that extends through this portion and a conical surface 61 formed at the end of the small diameter bore provides a seating surface for the relief valve pintle 57. The relief valve pintle 57 has a complimentary conical sealing surface that is adapted to cooperate with the conical surface 61. A small notch is provided in the conical surface 61 to establish a bleed orifice so that a small amount of fluid under pressure will continually pass between the otherwise sealed surface of the relief valve pintle and the conical surface 61 to help to maintain the valve at its crackpoint and to aid in making the valve operation more responsive to relative changes that will occur as a result of changes in the position of the diaphragm 40 and the piston member 36. The fluid that passes between the conical surface 61 and the complimentary conical sealing surface on the end of the relief valve pintle enters the bore 60 and passes into the hollow interior of the piston 36 and from there the fluid can leak to the exterior of the load indicating apparatus.

The relief valve pintle 57 is connected at its end that is opposite its end having the conical surface to a connecting rod 62 by a ball and socket joint. The end of the connecting rod 62 that is opposite the end that is connected to the relief valve pintle 57 is equipped with a lock nut to clamp a balance diaphragm 63 and an adjacent piston 64 against the end of a supply valve 65, through which the connecting rod passes. The connecting rod 62 is also provided with a central axial bore 66 which communicates with a radial aperture 67 that is provided in an enlarged portion 68 of the connecting rod that is situated adjacent to the ball and socket joint at the end of the pintle 57 and lies within a recess provided for it in the supply valve 65.

A supply valve seat ring 69 is situated at one end of the cylindrical bore 59 in the valve body 41 and is suitably held in position by an adjacent lip that is situated at the end of the bore. The perimeter of the seat ring 69 is sealed within the bore by an O-ring and the seat ring has a cylindrical bore 70 that is provided with a conical sealing surface which is adapted to cooperate with a similar surface provided in an enlarged portion at the end of the supply valve 65. The opposite end of the bore 70 accommodates the end of the jet tube 55 which extends into the bore and is substantially smaller in diameter than the bore 70, so that an appreciable amount of clearance will exist between the exterior of the jet tube and the surface of the bore in order to provide adequate space for the passage of pressurized fluid.

A head screw 71 is threadably secured to an outer clamping ring 72 which is secured to the regulator valve body 41 and the head screw has a recess that is adapted to receive one end of a light compression spring 73, while the other end of the spring is positioned in a cavity in the piston 64. The spring 73 acts against the supply valve 65 through the piston 64 and urges it toward its closed position. The outer periphery of the balance diaphragm 63 is also sealingly attached to the outer clamp ring 72.

As illustrated in FIG. 2, it is important that a clearance or distance D exist between the flange 43 and the outer end or face of the piston 36 when the bearing cones 19 of the bearings 14 and 15 are in their fully seated positions and the shaft 10 and the piston 36 are in their unloaded positions or furthermost to the left as illustrated in the drawings. This distance D is necessary to permit the shaft 10, the bearing 31 and the piston 36 to move axially to the right as illustrated in the drawings in response to radial loads applied to the shaft. In the preferred embodiment, this distance D should be between about 0.002 and 0.006 of an inch for the best results. The distance D should not be more than 0.006 of an inch or the bearings 14 and 15 may be damaged as a result of the bearing cones 19 moving too far from their fully seated positions.

When the pinion 24 is rotated, it transmits the loads applied to it to the shaft 10 in a radial direction. Since the tapered roller bearings 14 and 15 have tapered rollers 18 located between the inner bearing cones 19 and the outer bearing cups 16 that taper in the same direction, the radial loads thus imparted to the shaft by the pinion 24 or by any other alternative means, are translated through the bearings into an axial force acting on the shaft 10 toward the right as viewed in the drawing. This axial force results in an extremely small controlled movement of the shaft 10, which is attained through the unique utilization of the tapered roller bearings 14 and 15.

When these radial loads are applied to the shaft 10, they are imposed upon each of the inner bearing cones 19 that are associated with the respective tapered roller bearings 14 and 15. These loads are then transmitted to the conical tapered rollers 18 that are rotatably supported by their respective conical cages 17 in each of the bearings 14 and 15 and from the conical rollers these loads are transmitted to the outer bearing cups 16 of each bearing that are respectively supported within the recesses 28 and 29 provided for them in the housing 11. Since the angle of the conical surface of the outer bearing cups 16 that cooperate with the peripheral surface of the tapered rollers 18 is greater than the angle of the conical surface of the inner bearing cones 19 that also cooperate with the peripheral surface of the tapered rollers 18, when a radial force is applied to the shaft 10 and the inner bearing cones 19, the tapered rollers 18 are forced to the right as illustrated in the drawing or away from their fully seated positions in the outer cups 16 and the associated inner bearing cones 19 are also forced to the right as a result of this movement of the rollers 18. It should be appreciated that in the conventional application of tapered roller bearings this reactionary tendency of the bearing elements is normally counteracted by providing two tapered roller bearings that are arranged so that the tapered rollers of the two bearings taper in opposite directions in order that these resultant axial forces will be effectively nunified or cancelled out.

In the present invention, the axial forces caused by the reaction of the roller bearings 14 and 15 to the radial loads applied to the shaft 10, are advantageously used and the resultant axial movement of the inner bearing cone 19 associated with the bearing 15 is directed against the adjacent surface of the enlarged portion 23 provided on the shaft 10 and this results in axial movement of the shaft. This action is duplicated by the similar components of the roller bearing 14, except that the axial movement of the inner bearing cone 19 of the bearing member 14 is directed against the adjacent surface of the collar 30. As a result of the axial movement of the shaft 10 caused by the roller bearings 14 and 15, the outer surface of the collar 30 pushes against the inner race 32 and forces the inner race, the balls 34 and the outer race 33 of the thrust bearing 31 that is positioned adjacent to collar on the shaft 10 to move to the right. The axial thrust and resulting motion is then transferred by the thrust bearing 31 to the adjacent piston 36 and from the piston to the connected diaphragm 40. Since the diaphragm 40 forms one wall of the pressure control chamber 51, it is apparent that axial movement of the flexible diaphragm 40 will change the volume of the pressure control chamber as a result of variations in the radial loads placed upon the rotating shaft 10.

To obtain an understanding of the operation of the apparatus, it will be helpful to first assume that the shaft 10 is rotating and that the pressure control chamber 51 has been provided with a sufficient amount of fluid from an external source (not shown) so that the pressure in the pressure control chamber that acts upon the diaphragm 40 is sufficient to balance the radial loads upon the shaft 10. In this condition, the conical surface located on the end of the relief valve pintle 57 will, with the aid of the aforementioned notch in the conical surface 61, be at its crackpoint with respect to its relationship to the conical surface 61 at the end of the bore 60 of the relief valve body 54. In this position, the axial thrust created by the radial load upon shaft 10 is opposed by fluid pressure exerted against the diaphragm 40 by the fluid supplied to the control chamber 51 from the expansion chamber 50 through the restricted passage 53 provided in the seal plate 52 that segregates both chambers, and by fluid supplied to the control chamber 51 from the expansion chamber 50 that passes around the end of the jet tube 55 into the bore 70, into the fluid passageway 58, into the stepped cavity 56 and into the control chamber.

In this balanced condition with a radial load applied to the shaft 10, the shaft, the piston 36 and the connected diaphragm 40 will have moved to the right from their furthermost seated or left positions as seen in FIG. 1 as a result of the radial load. As a result of this movement, the piston 36 will have pushed the relief valve pintle 57 and the connecting rod 62 that is connected to the pintle by the ball and socket joint to the right and this will have caused the connected supply valve 65 to also move to the right away from its seat at the end of the bore 70 in the supply valve seat ring 69 so that a quantity of fluid will have been admitted from the inlet conduit 46 into the expansion chamber 50 and from there into the control chamber 51 to balance the radial load on the shaft 10. The movement of the valve 65 to the right will have resulted in the connected adjacent diaphragm 63 and piston 64 having been moved to the right to cause the adjacent spring 73 to be compressed.

It should be noted that the connected radial and central passageways 67 and 66 in the connecting rod 62 provide a passageway for fluid to flow from the expansion chamber 50 to the cavity in the outer clamping ring 72 between the end of the piston 64 and the recess in the head screw 71 or from the cavity to the expansion chamber 50. Consequently, there is little or no pressure differential between the pressure exerted in the expansion chamber 50 and the pressure exerted in the cavity in the outer clamping ring 72 between the piston 64 and the recess in the head screw 71 and this permits a relatively weak spring 73 to be utilized to operate the valve 65.

After the load indicating apparatus is in a balanced condition, if the radial load on the shaft 10 is reduced, the pressurized fluid in the control chamber 51 will exert a force against the diaphragm 40 and the connected piston 36 that is greater than the axial force exerted against the piston by the shaft 10 as a result of the radial load on the shaft and as a consequence the diaphragm 40, the connected piston 36, the bearing 31 and the adjacent shaft 10 will be forced to the left as viewed in FIG. 1. As the piston 36 moves to the left, pressure exerted by the spring 73 against the piston 64 will cause the piston 64, the connected diaphragm 63, the valve 65, the connected connecting rod 62, and the pintle 57 that is connected to the connecting rod by the ball and socket joint to move to the left since the conical end of this pintle rests against the surface 61 of the piston 36 that is moving to the left. As the valve 65 moves to the left, the distance between the valve and the valve seat ring 69 will decrease and thus the amount of fluid that enters the expansion chamber 50 and the connected control chamber 51 will decrease. Since the volume of the control chamber 51 has increased as a result of the deflection or movement of the diaphragm 40 to the left and since the volume of fluid entering the control chamber 51 has been reduced by the partial closing of the valve 65, the pressure in the control chamber 51 will be reduced and thus the force exerted against the diaphragm 40 and the connected piston will also be reduced. When the diaphragm 40 and the connected piston 36 have moved sufficiently to the left so that the fluid pressure exerted in the control chamber 51 has been reduced to a point where the force exerted by this pressure just balances the axial force on the shaft 10 caused by the reduced radial load applied to the shaft, no further movement of the shaft 10, the piston 36, the bearing 31 and the diaphragm 40 will take place and the load indicating apparatus will be in its balanced condition for that particular radial load that is applied to the shaft.

If the radial load applied to the shaft 10 is then increased, this will result in movement of the shaft, the attached collar 30, the thrust bearing 31, the piston 36 and the connected diaphragm 40 to the right since the axial force exerted on the shaft 10 from the radial load as a result of the arrangement of the tapered roller bearings 14 and 15 will be greater than the opposing force exerted against the diaphragm 40 by the pressurized fluid in the control chamber 51. As the piston 36 moves to the right, it will push the pintle 57, the connecting rod 62 that is connected to the pintle to the right and this will cause the connected supply valve 65 to move to the right away from its valve seat ring 69 so that an increased quantity of pressurized fluid will enter the expansion chamber 50 and the connected control chamber 51 from the inlet 44. Since the volume of the control chamber 51 has decreased as a result of the deflection or movement of the diaphragm 40 to the right and since the volume of fluid entering the expansion chamber 50 and the connected control chamber 51 has increased as a result of the further opening or movement of the valve 65 to the right, the pressure in the control chamber 51 will increase and thus the force exerted against the diaphragm and the connected piston will also increase. When the diaphragm 40, the connected piston 36, and the valve 65 have moved sufficiently to the right so that the fluid pressure exerted in the control chamber 51 has increased to a point where the force exerted by this pressure just balances the increased axial force on the shaft 10 caused by the increased radial load applied to the shaft, no further movement of the shaft 10, piston 36, diaphragm 40 and valve 63 will take place and the load indicating apparatus will be in its balanced condition for that particular increased radial load that is applied to the shaft.

When the load indicating apparatus is in its balanced condition for any given radial load that is applied to the shaft 10, the pressure in the fluid outlet conduit 47 will be equal to the pressure in the control chamber 51 that acts against the diaphragm 40 and the connected piston 36 to hold the shaft 10 in its balanced postion. In this balanced condition, the force resulting from the fluid pressure in the control chamber 51 times the area of the diaphragm 40 and the area of the relief valve body 54 that are exposed to this pressure just equals the axial force exerted on the shaft 10 as a result of the radial load applied to the shaft and since the pressure in the fluid outlet conduit 47 is equal to the pressure in the control chamber 51, the gauge 48 that is connected to the outlet conduit that indicates the pressure in the outlet conduit 47 will provide an indication of the radial load imposed upon the shaft 10. The conduit 49 that is connected to the outlet conduit 47 through the gauge 48 can also be utilized to transmit pressurized fluid to provide a remote indication of the radial load applied to the shaft 10 or this pressurized fluid in the conduit 49 can be utilized to actuate or control other equipment (not shown).

When the load indicating apparatus is in its balanced condition for any given radial load that is received by the shaft 10, the force exerted by the pressurized fluid in the control chamber 51 against the shaft 10 that balances the forces exerted against the shaft by the inner bearing cones 19 as a result of the radial load received by the shaft is determined substantially according to the formula, $$F = L_1 \tan \alpha_1 + \ldots + L_n \tan \alpha_n$$

where F is the force exerted that balances the forces exerted against the shaft by the inner bearing cones 19, $L_1$ is the portion of the radial load received by the shaft 10 that is exerted on the first tapered roller bearing, $\alpha_1$ is the angle between the central axis of the shaft 10 and the inside sloping surface of the outer bearing cup of the first roller bearing, $L_n$ is the portion of the radial load received by the shaft 10 that is exerted on the n th tapered roller bearing, and $\alpha_n$ is the angle between the central axis of the shaft 10 and the inside sloping surface of the outer bearing cup of the n th tapered roller bearing. For the preferred embodiment of the invention illustrated in the drawings that utilizes two tapered roller bearings, the above formula reduces to, $$F = L_1 \tan \alpha_1 + L_2 \tan \alpha_2$$

where $L_2$ is the portion of the radial load received by the shaft that is exerted in the 2nd tapered roller bearing and $\alpha_2$ is the angle between the central axis of the shaft 10 and the inside sloping surface of the outer bearing cup of the 2nd tapered roller bearing.

When the load indicating apparatus is in its balanced condition for any given radial load received by the shaft as indicated above, the pressure in the control chamber 51 and the pressure in the outlet conduit 47 is determined substantially according to the formula, $$P = (L_1 \tan \alpha_1 + \ldots + L_n \tan \alpha_n)/A$$

where P is the pressure in the control chamber 51 and in the outlet conduit, A is the effective area that the pressure in the chamber 51 acts against and $L_1$, $L_n$, $\alpha_1$ and $\alpha_n$ have their previous meanings. For the embodiment illustrated in the drawings, the above formula becomes, $$P = (L_1 \tan \alpha_1 + L_2 \tan \alpha_2)/A$$

where P, $L_1$, $L_2$, $\alpha_1$, $\alpha_2$ and A all have their previous meanings.

It will be appreciated that the load indicating apparatus of the present invention can operate equally as well with the shaft 10 rotating in a counterclockwise direction as it can with the shaft 10 rotating in a clockwise direction and thus this load indicating apparatus possesses a flexibility that prior loading indicating apparatus do not possess. It will also be noted that in the event a fluid pressure failure occurs that causes a loss of fluid from the control chamber 51 when the shaft 10 has a radial load, the flange 43 of the housing member 13, will limit the axial movement of the shaft 10 to the right as illustrated in the drawings so that the shaft will continue to rotate under load without damage to the tapered roller bearings 14 and 15. In the preferred embodiment, the pressurized fluid should be air however, other gases and even liquids can be utilized with the invention.

Although the invention has been described with reference to a preferred embodiment, it will be understood that variations and modifications may be made within the spirit and scope of the invention as defined in the appended claims.

What is claimed is:

1. Apparatus for providing an indication of radial loads comprising: a rotatable member for receiving the radial loads; means for supporting said rotatable member, said supporting means being adapted to permit axial movement of said rotatable member and having means for limiting the extent of the axial movement of said rotatable member; a plurality of tapered roller bearings located around said rotatable member, each of said roller bearings comprising an inner bearing cone located around and adjacent said rotatable member, an outer bearing cup connected to said supporting member, and tapered rollers located between said inner bearing cone and said outer bearing cup, each of said plurality of tapered roller bearings having their tapered rollers tapering in the same direction, said inner bearing cones of each of said plurality of tapered roller bearings being movable axially in the same direction from their seated positions in the respective bearing cups in response to the radial load received by said rotatable member and being adapted to exert an axial force against said rotatable member to cause axial movement of said rotatable member in response to the radial load received by said rotatable member; means located adjacent to said rotatable member to exert a force upon said rotatable member that balances the forces exerted against said rotatable member by said inner bearing cones as a result of the radial load received by said rotatable member; and means operatively connected to said force exerting means for providing an indication related to the radial loads received by said rotatable member.

2. The apparatus of claim 1, wherein said force exerting means comprises means for exerting fluid pressure to balance the forces exerted by said inner bearing cones against said rotatable member.

3. The apparatus of claim 2, wherein said fluid pressure exerting means is activated by the axial movement of said rotatable member.

4. The apparatus of claim 3, wherein said fluid pressure exerting means includes a variable volume chamber having a flexible diaphragm operatively connected to said rotatable member.

5. The apparatus of claim 4, wherein said fluid pressure exerting means includes a second chamber communicable with said variable volume chamber that is adapted to receive pressurized fluid that is transmitted to or from said variable volume chamber.

6. The apparatus of claim 5, wherein said flexible diaphragm is operatively connected to said rotatable member by means of an axially movable piston member connected to said diaphragm and an axially movable thrust bearing located adjacent to one end of said rotatable member and said piston member.

7. The apparatus of claim 6 wherein said fluid pressure exerting means includes valve means for controlling the flow of pressurized fluid to said second chamber and wherein activation of said fluid pressure exerting means by the axial movement of said rotatable member is accomplished by said valve means.

8. The apparatus of claim 7, wherein said valve means is operatively connected to said piston member and said diaphragm.

9. The apparatus of claim 1, wherein the force exerted upon said rotatable member by said force exerting means that balances the forces exerted against said rotatable member by said inner bearing cones is determined substantially according to the formula, $$F = L_1 \tan\alpha_1 + \ldots + L_n \tan\alpha_n$$

where F is the force exerted by said force exerting means, $L_1$ is the portion of the radial load received by said rotatable member that is exerted on the first tapered roller bearing, $\alpha_1$ is the angle between the central axis of the rotatable member and the inside sloping surface of the bearing cup of the first tapered roller bearing, $L_n$ is the portion of the radial load received by said rotatable member that is exerted on the nth tapered roller bearing, and $\alpha_n$ is the angle between the central axis of the rotatable member and the inside sloping surface of the bearing cup of the nth tapered roller bearing.

10. The apparatus of claim 1, wherein said means for limiting axial movement of said rotatable member limits the axial movement of said rotatable member to between about 0.002 of an inch and about 0.006 of an inch.

* * * * *